US008381142B1

(12) United States Patent
Hutton

(10) Patent No.: US 8,381,142 B1
(45) Date of Patent: Feb. 19, 2013

(54) USING A TIMING EXCEPTION TO POSTPONE RETIMING

(75) Inventor: Michael D. Hutton, Mountain View, CA (US)

(73) Assignee: Altera Corporation, San Jose, CA (US)

( * ) Notice: Subject to any disclaimer, the term of this patent is extended or adjusted under 35 U.S.C. 154(b) by 735 days.

(21) Appl. No.: 11/973,470

(22) Filed: Oct. 9, 2007

(51) Int. Cl.
   *G06F 17/50* (2006.01)
(52) U.S. Cl. ........ 716/100; 716/101; 716/104; 716/106; 716/108; 716/110; 716/113; 716/134
(58) Field of Classification Search .......... 716/100–108, 716/110–113, 119, 122, 132, 134
See application file for complete search history.

(56) References Cited

U.S. PATENT DOCUMENTS

| 7,120,883 | B1 | 10/2006 | van Antwerpen et al. | |
|---|---|---|---|---|
| 7,133,819 | B1 | 11/2006 | Hutton | |
| 7,171,633 | B1 | 1/2007 | Hwang et al. | |
| 2004/0199878 | A1* | 10/2004 | Oktem et al. | 716/1 |
| 2005/0062496 | A1* | 3/2005 | Gidon et al. | 326/40 |
| 2005/0132316 | A1* | 6/2005 | Suaris et al. | 716/11 |
| 2008/0276208 | A1* | 11/2008 | Albrecht et al. | 716/6 |

OTHER PUBLICATIONS

U.S. Appl. No. 10/876,709, filed Jun. 25, 2004, Singh et al.
U.S. Appl. No. 11/187,722, filed Jul. 21, 2005, Hutton et al.
U.S. Appl. No. 11/703,372, filed Feb. 7, 2007, Blunno et al.
U.S. Appl. No. 11/704,497, filed Feb. 7, 2007, Singh et al.
Cong, J. et al. "FlowMap: An Optimal Technology Mapping Algorithm for Delay Optimization in Lookup-Table Based FPGA Designs," IEEE Transactions on Computer-Aided Design of Integrated Circuits and Systems, Jan. 1994, vol. 13(1), pp. 1-12.
Cormen, T. H. et al. An Introduction to Algorithms, 1990, Chapter 27, pp. 579-599, MIT Press, Cambridge MA.
Manohararajah, V. et al. "Difficulty of Predicting Interconnect Delay in a Timing Driven FPGA CAD Flow," SLIP'06, Mar. 4-5, 2006, Munich, Germany, 6 pages.
Singh, D. P. et al. "Incremental Retiming for FPGA Physical Synthesis," DAC 2005, Jun. 13-17, 2005, Anaheim, California, 6 pages.
Singh, D. P. et al. "Two-Stage Physical Synthesis for FPGAs," CICC (Custom Integrated Circuits Conference), Sep. 18, 2005, 8 pages.
"The PrimeTime® Static Timing Analysis (STA) Golden Timing Sign-Off Solution and Environment," Synopsys, Inc., 2007, pp. 1-3, http://www.synopsys.com.
"The Quartus II TimeQuest Timing Analyzer," Quartus II Handbook, vol. 3, Altera Corporation May 2007, pp. 6-1 to 6-98, http://www.altera.com.
Van Antwerpen, B. et al. "A Safe and Complete Gate-Level Register Retiming Algorithm," IWLS (International Conference on Logic and Synthesis), May 28, 2003, 8 pages.

*Primary Examiner* — Paul Dinh
(74) *Attorney, Agent, or Firm* — Mauriel Kapouytian & Treffert LLP; Ararat Kapouytian

(57) ABSTRACT

A method for designing a system on a target device is described. In one embodiment of the method, a plurality of registers is replaced with at least one register and a timing exception. In one embodiment, the registers in the plurality of registers are in series or substantially in series. In one embodiment, the timing exception is a multi-cycle exception. In one embodiment, the method also includes identifying a critical combinational logic path that is followed or preceded by the plurality of registers. Further, in one aspect, the timing exception is removed and registers are inserted into the critical combinational logic path to account for the removed timing exception. In one embodiment, a network flow algorithm is performed to determine the locations for inserting registers.

19 Claims, 8 Drawing Sheets

USING A TIMING EXCEPTION TO POSTPONE RETIMING

BACKGROUND

The present invention relates to methods and tools, such as electronic design automation (EDA) tools, for designing systems cm a target device.

EDA or computer aided design (CAD) tools are used for designing systems on integrated circuits (ICs). Examples of ICs include application specific integrated circuits (ASICs) and programmable logic devices (PLDs) (which are also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), field programmable gate arrays (FPGAs), or by other names).

A process of designing a system on a target device using EDA or CAD tools may include the following: design entry, synthesis, technology mapping, placement, and routing. Synthesis often includes retiming, which is also sometimes referred to as register retiming. Register retiming is a moving or rearranging of registers across combinatorial logic in a design in order to improve the maximum operating frequency (fmax) of the system.

Register retiming during synthesis is relatively easy to accomplish because it is relatively easy to move gates (i.e., logic devices in the system) and registers at that early stage of the design process. However, register retiming during synthesis also has the following disadvantage. Delay estimates during synthesis are less accurate than during later stages. This is partly because the distance between devices plays an important role in determining delay and there is less information regarding this distance during the synthesis stage than at later stages of the design process.

Retiming, such as register retiming, may also occur during later stages of the design process, such as placement. One advantage of register retiming at this stage is that delay estimates are better known than at earlier stages. However, there are also disadvantages associated with register retiming during placement. First, moving gates and registers is relatively more difficult during placement than during earlier stages of the design process. Second, it is computationally more intensive because of the requirement for incremental compilation associated with the incremental placement resulting from register retiming at the placement stage.

SUMMARY

According to an embodiment of the present invention, a plurality of registers is replaced with at least one register and a timing exception. In one embodiment, the registers in the plurality of registers are in series or nearly in series. In one embodiment, the timing exception is a multicycle exception. In one embodiment, the method also includes identifying a critical combinational logic path that is followed or preceded by the plurality of registers.

Further, in one aspect, the timing exception is removed and registers are inserted into the critical combinational logic path to account for the removed timing exception. In one embodiment, a network flow algorithm is performed to determine the locations for inserting registers.

Without the present invention's replacement of a plurality of registers with at least one register and a timing exception, the placer module in the placement stage may focus on the placement of gates and registers in the path with the longest delay (which may be a critical combinational logic path that is followed or preceded by a plurality of registers) at the expense of ignoring paths with medium or long delays. This may result in potentially poor placement for these other paths. The placer module may have this misplaced focus because it may fail to account for the fact that register retiming during the placement stage or a later stage may reduce the delay of the path with the longest delay. On the other hand, the paths with medium or long delays may be such that their delays may not be easily reduced using retiming, e.g., retiming during the placement stage.

On the other hand, with the present invention's replacement of a plurality of registers with at least one register and a timing exception, the placer module may focus more on paths with medium or long delays which may not be easily reduced using retiming.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
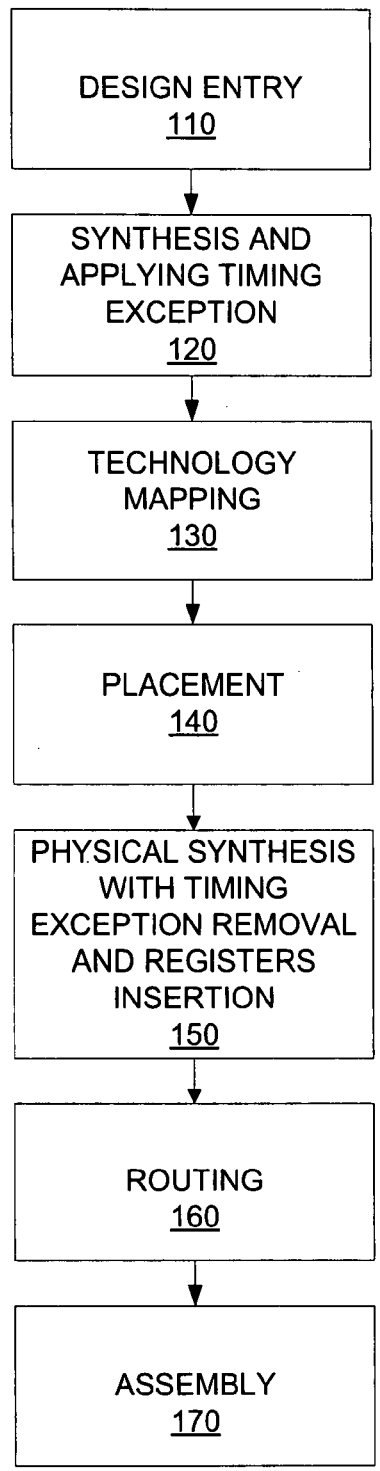
FIG. 1 is a flow chart illustrating a method for designing a system on a target device according to an exemplary embodiment of the present invention.

FIG. 1 is a flow chart illustrating a method for designing a system on a target device according to an embodiment of the present invention. At 110, a design for the system is entered into a design tool. The design may be described at a gate level or at a more abstract level. The design may be described in terms of a hardware description language (HDL) such as VHDL or Verilog. The target device may be an ASIC, structured ASIC, PLD (e.g., an FPGA), or other target device.

At 120, the system is synthesized. Synthesis 120 includes generating a logic design of the system to be implemented. According to an embodiment of the present invention, synthesis generates an optimized logical representation of the system from an HDL design definition. The optimized logical representation of the system may include a representation that has a minimized number of functional blocks and registers, such as logic gates and logic elements, required for the system.

Synthesis 120 of the present invention, unlike a standard synthesis, includes (1) identifying critical combinational logic paths adjacent to multiple registers that are in series or nearly in series (which may also herein be referred to as substantially in series) and (2) replacing the multiple registers with a register and a timing exception on the critical combinational logic path. As used herein, multiple registers that are nearly in series refers to multiple registers that would be in series but for minor combinational logic elements that are between some registers of the multiple registers. In one embodiment, the multiple registers are replaced with a single register and a timing exception. In another embodiment, the multiple registers may be replaced with more than one register and a timing exception. In one embodiment, the timing exception is a multicycle-k timing exception, where k represents the number of registers removed in the operation.

It is to be noted that in some cases a designer may have placed registers in series intentionally as synchronization registers, e.g., to avoid issues with metastability or other phenomena. In such a situation, it would be undesirable to retime these registers, as it would defeat the designer's intent. Recognizing this, in one embodiment of the present invention, a "don't touch" indication may be manually applied to such registers as a logic option by the designer, and registers containing this indication would not be considered candidates for retiming. Mechanisms for applying a "don't touch" indication to registers for general retiming are described in U.S. Pat. No. 7,120,883, which is entitled "Register Retiming Technique" and is incorporated herein by reference.

In one embodiment, registers subject to a "don't touch" indication would not be replaced by one or more registers and a timing exception, even if the registers subject to the "don't touch" indication are in series and are adjacent to a critical combinational logic path. Also, in one embodiment where registers subject to a "don't touch" indication are adjacent to a plurality of registers that are in series or substantially in series but are not subject to a "don't touch" indication, unlike the registers subject to a "don't touch" indication, the plurality of registers that are in series or substantially in series but are not subject to a "don't touch" indication may be replaced by one or more registers and a timing exception. In other words, the plurality of registers that are in series or substantially in series but are not subject to a "don't touch" indication may be replaced by one or more registers and a timing exception, whereas the registers subject to a "don't touch" indication would not be subjected to such a replacement.

As used herein, a critical combinational logic path is one that meets a predetermined criticality criterion. For example, in one embodiment, a critical combinational logic path is one that has a delay that is the relative longest path within a given timing classification or clock domain. In another embodiment, this criticality can be determined by comparing an estimate of a path delay to a predefined absolute time constraint for paths in the timing classification or clock domain of the path. If the estimated path delay is greater than the predefined absolute time constraint, then the path would be considered a critical path. The comparison of the estimated path delays with the predefined absolute time constraint may also be used to rank the relative criticality of the paths. In one embodiment, the predefined absolute time constraint is selected by the circuit designer and may have any suitable value. For example, in one embodiment, it may be 10 nanoseconds. It is to be noted that the predefined absolute time constraint is not limited to being 10 nanoseconds, but may be any other suitable value. Exemplary methods for estimating critical paths in a synthesis or post-synthesis netlist prior to placement are described in U.S. Pat. No. 7,133,819, which is entitled "Method For Adaptive Critical Path Delay Estimation During Timing-Driven Placement For Hierarchical Programmable Logic Devices", U.S. Pat. No. 7,171,633, which is entitled "Estimating Quality During Early Synthesis," and U.S. patent application Ser. No. 11/187,722, which is entitled "Early Timing Estimation Of Timing Statistical Properties Of Placement." It is to be noted that the term critical combinational logic path refers to a long combinational logic path relative to a constraint and is not limited simply to the longest combinational logic path in a netlist. The terms critical combinational logic path and long combinational logic path may be used interchangeably herein.

As noted above, in one embodiment, the timing exception is a multicycle exception. More specifically, in one embodiment, the timing exception is a multicycle-k timing exception, where, as noted above, k represents the number of registers removed when imposing the timing exception. It is to be noted that the timing exception applied is created by the EDA tool as an artifact of removing registers and as a proxy for the removed registers. This is in contrast to standard timing exceptions, such as standard multicycle exceptions, which are arbitrary constraints applied by the designer on delays between registers.

It is to be noted that unlike a standard synthesis, in one embodiment, no retiming is performed during synthesis. In another embodiment, retiming is performed during synthesis, but only after that above-mentioned timing exception is applied.

One way to identify critical or long combinational logic paths followed by or preceding a set of registers in series or nearly in series is when they are generated by a high-level tool. For example, the DSP-Builder™ tool (available from Altera® Corporation) converts high-level specifications (e.g., in MATLAB® which is available from The MathWorks®, Inc.) of digital signal processing (DSP) functionality into synthesizable HDL. The DSP-Builder™ tool is aware of latency requirements and the need to put additional registers on paths to synchronize timing; and is also aware of the relative delays of combinational logic blocks. In one embodiment, the DSP-Builder™ operation is enhanced to pass information, regarding the latency requirements and the relative delays of combinational logic paths to the synthesis, placement and routing tool chain (e.g., Quartus™ (available from Altera® Corporation), ISE™ (available from Xilinx®, Inc.), or some other tool chain) indicating the combinational logic paths on which to impose timing exceptions.

A second tool for identifying critical or long combinational logic paths followed by or preceding a set of registers in series or nearly in series is the system-builder set of tools (which are also sometimes referred to as system-level tools). For example, the SOPC-Builder™ (available from Altera® Corporation) or CORE Generator™ (available from Xilinx®, Inc.) generates bus and arbitration structures between components in a larger system. Often the most critical combinational logic path (i.e., the longest combinational logic path) of the overall system is an arbitration unit within the connection structure, e.g., in Avalon™ Streaming bus-fabric generated systems, because this is a connection of often many wide busses with additional combinational logic for arbitration and back-pressure. Avalon™ Streaming is available from Altera® Corporation. Again, the system-level tool is aware of the paths that are likely to be critical, as well as the additional latency registers added to maintain correct cycle-accurate operation of the system. The system-level may provide this information to the synthesis, placement, and routing tool chain.

In one embodiment, particularly in a context where none of the above more sophisticated methods for identifying or finding critical combinational logic paths upon which a timing exception is to be imposed is available, a more general method for identifying or finding such combinational logic paths may be used. For example, a simple unit delay based method, which estimates the delay of a path based on the number of logic cells or gates on the path, may be used.

At 130, technology mapping is performed on the optimized logic design. Technology mapping includes determining how to implement logic gates and logic elements in the optimized logic representation with resources (components) available on the target device. According to an embodiment of the present invention, a netlist is generated from mapping. This netlist may be an optimized technology-mapped netlist generated from the HDL.

At 140, the mapped logical system design is placed. Placement works on the optimized technology-mapped netlist to produce a placement for each of the functional blocks. According to an embodiment of the present invention for a target device that is a structured ASIC, placement includes fitting the system on the target device by determining which components in the logic design are to be used for specific logic elements and other function blocks. Placement may include clustering which involves grouping logic elements together to form the logic clusters present on the target device. As a result of the timing exception imposed on the critical combinational logic paths, such paths are not treated as critical during placement. Consequently, other medium length combinational logic paths which are not subject to a timing exception are not overlooked during placement.

At 150, a physical synthesis that includes removal of the timing exception imposed during synthesis at 120 and insertion of registers back into the netlist is performed. This insertion of registers is to account for the removal of the timing exception. It is also intended to replace the registers that were removed when the timing exception was imposed. In one embodiment, the number of registers inserted is equal to the number of registers that were removed. Thereafter, in one embodiment, the inserted registers are retimed, i.e., moved backward or forward in the netlist as appropriate. Methods of removing the timing exception and inserting registers of the present invention are described in more detail below in reference to FIGS. 4-6.

At 160, it is determined which routing resources should be used to connect the components in the logic design implementing the functional blocks of the system. During routing, routing resources on the target device are allocated to provide interconnections between logic gates, logic elements, and other components on the target device. The routing procedure may be performed by a router in an EDA tool that utilizes routing algorithms.

At 170, an assembly procedure is performed. The assembly procedure involves creating a data file that includes information determined and/or results generated by the procedures of 110 to 160. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

In one embodiment, method 100 of FIG. 1 may, in addition to physical synthesis at 150, include physical synthesis at one or more stages in the design flow (immediately after design entry at 110, immediately after synthesis and applying a timing exception at 120, immediately after technology mapping at 130, and immediately after routing at 160). It should be appreciated that additional stages of physical synthesis may be implemented, that physical synthesis may be implemented at stages other than the stages that are shown, and that physical synthesis may be performed within one or more of the procedures 110, 120, 130, 140 and/or 160. According to an embodiment of the present invention, physical synthesis includes a series of circuit transformations to optimize the circuit for a given goal. The circuit transformations occur outside the stage of design entry, synthesis, technology mapping, placement, and routing. Physical synthesis may be used to optimize a circuit for goals such as reducing a delay of a signal transmitted on a circuit, reduction of an area required for implementing the circuit on a target device, reducing the amount of power required for operating the circuit or the system, improving the routability of the circuit, and/or other goals.

Figure 2:
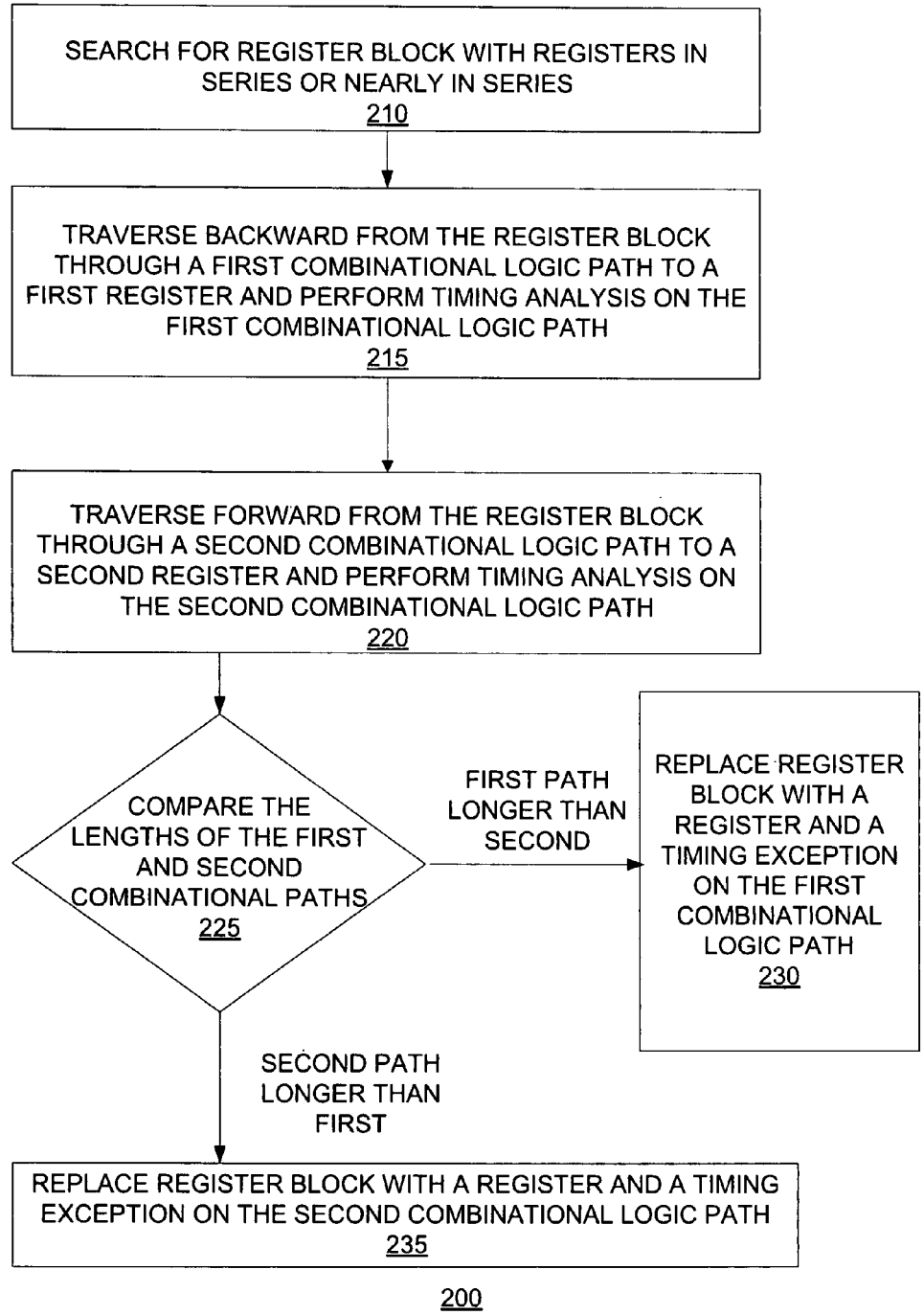
FIG. 2 is a flow chart of one embodiment of the method of replacing registers with a register and timing exception.

FIG. 2 is a flow chart of one embodiment of the method of replacing multiple registers with a register and timing exception. Additionally, method 200 of FIG. 2 also illustrates to which combinational logic path the timing exception should be applied when the registers are adjacent to multiple combinational logic paths. At 210, the EDA tool searches the netlist for a register block that includes multiple registers that are in series or nearly in series. This search allows for identifying or finding such register blocks. At 215, the EDA tool traverses backward from the register block through a first combinational logic path to a first register and performs a timing analysis on the first combinational logic path. At 220, the EDA tool traverses forward from the register block through a second combinational logic path to a second register and performs a timing analysis on the second combinational logic path. It is to be noted that 215 and 220 may be performed in an order reverse of that shown in FIG. 2. At 225, the EDA tool compares the lengths of the first and second combinational logic paths. In other words, it compares the times for traversing the first and second combinational logic paths. The times for traversing a combinational logic path and the length of a combinational path may herein be used interchangeably. If the first combinational logic path is longer than the second combinational path, then at 230, the register block is replaced by a register and a timing exception is imposed on the first combinational logic path. On the other hand, if the second combinational logic path is longer than the first combinational logic path, then at 235, the register block is replaced by a register and a timing exception is imposed on the second combinational logic path.

Figure 3:
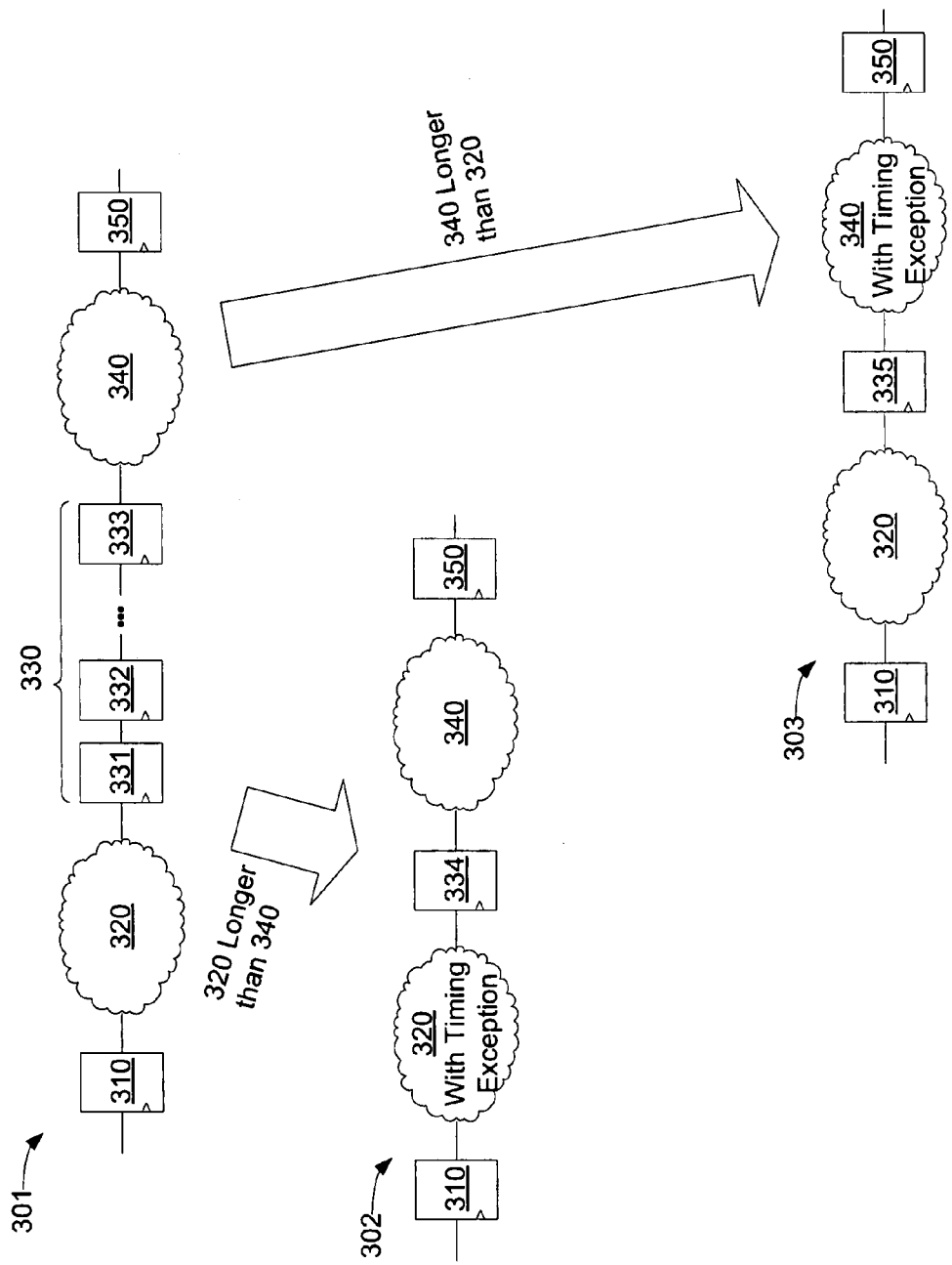
FIG. 3 illustrates examples of register replacement and timing exception applications according to the method of FIG. 2.

FIG. 3 illustrates examples of register replacement and timing exception applications according to the method of FIG. 2. In FIG. 3, circuit path 301 is replaced with circuit path 302 or circuit path 303 depending on conditions within circuit path 301.

Circuit path 301 includes register 310, combinational logic path 320, register block 330, combinational logic path 340, and register 350. Combinational logic paths 320 and 340 are long combinational logic paths. Register block 330 includes multiple registers, only three of which, registers 331, 332, and 333, are shown in order to avoid complicating FIG. 3. The registers in register block 330 are coupled in series or nearly in series. In one embodiment, in place of register 310 there may be a register block that includes multiple registers coupled in series or nearly in series. Similarly, in one embodiment, in place of register 350 there may be a register block that includes multiple registers coupled in series or nearly in series.

If combinational logic path 320 is longer (i.e., more critical) than combinational logic path 340, then circuit path 301 is converted to circuit path 302. This is accomplished by replacing the registers in register block 330 with a register 334 and imposing a timing exception on combinational logic path 320. On the other hand, if combinational logic path 340 is longer (i.e., more critical) than combinational logic path 320, then circuit path 301 is converted to circuit path 303. This is accomplished by replacing the registers in register block 330 with a register 335 and imposing a timing exception on combinational logic path 340. If combinational logic path 320 is equal in length to combinational logic path 340, then the timing exception may be applied to either combinational logic path 320 or 340.

In one embodiment, circuit path 301 may be such as not to include combinational logic path 340 or register 350. In other words, in such an embodiment, circuit path 301 would include register 310, combinational logic path 320, and register block 330, but not combinational logic path 340 or register 350. In such a case, registers in register block 330 would be replaced by a register and a corresponding timing exception would be applied to combinational logic path 320. In such a case, with reference to method 200 of FIG. 2, it may be said that the second combinational logic path does not exist and its length is zero, whereas the length of the first combinational logic path is not zero. As a result, the first combinational logic path is longer and the timing exception is applied thereto.

Similarly, in another embodiment, circuit path 301 may be such as not to include register 310 or combinational logic path 320. In other words, in such an embodiment, circuit path 301 would include register block 330, combinational logic path 340, and register 350, but not register 310 or combinational logic path 320. In such a case, registers in register block 330 would be replaced by a register and a corresponding timing exception would be applied to combinational logic path 340. Also, in such a case, with reference to method 200 of FIG. 2, it may be said that the first combinational logic path does not exist and its length is zero, whereas the length of the second combinational logic path is not zero. As a result, the second combinational logic path is longer and the timing exception is applied thereto.

In yet another embodiment, circuit path 301 may in place of register 350 include a register block that includes multiple registers coupled in series or nearly in series. In such an embodiment, registers in register block 330 may be replaced by a register and a corresponding timing exception would be applied to combinational logic path 320, whereas the multiple registers after combinational logic path 340 may be replaced by a register and a corresponding timing exception would be applied to combinational logic path 340. It is to be noted that in such a case, the above timing exceptions would be applied to combinational logic paths 320 and 340 so long as both are long combinational logic paths regardless of the relative length of the paths.

It is to be noted that circuit paths 301, 302, and 303 are not limited to being single-bit-wide paths. Instead, they may be any data width that exists in the netlist. For example, they may each be 2 bit, 4 bit, 8 bit, or 16 bit wide.

Figure 4:
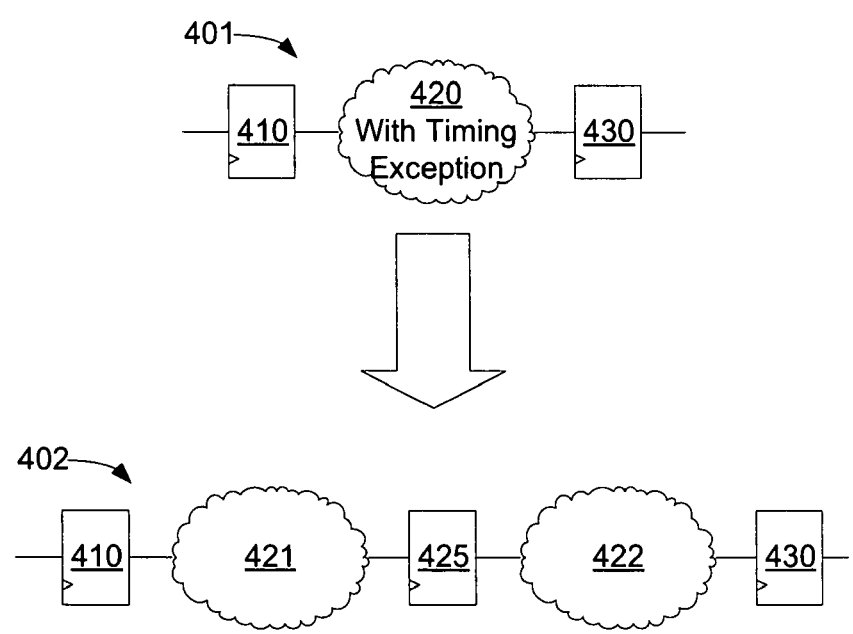
FIG. 4 illustrates schematic diagrams of one embodiment of a circuit path before and after removal of a timing exception and insertion of registers.

FIG. 4 illustrates schematic diagrams of one embodiment of a circuit path before and after removal of a timing exception and replacement of removed registers. In FIG. 4, circuit path 401 which includes a timing exception is replaced with circuit path 402 which does not include the timing exception.

Circuit path 401 includes register 410, combinational logic path 420, and register 430. Combinational logic path 420 includes a timing exception that was imposed according to an embodiment of the present invention. In one embodiment, in place of register 410 there may be a register block that includes multiple registers. Similarly, in one embodiment, in place of register 430 there may be a register block that includes multiple registers.

Circuit path 401 is replaced with circuit path 402. This is accomplished by removing the timing exception imposed on combinational logic path 420 and inserting registers in combinational logic path 420 to account for removal of the timing exception that was imposed on combinational logic path 420. The inserted registers also replace the registers that were removed when the timing exception was imposed on combinational logic path 420. Methods for register replacement are described in more detail below in reference to FIGS. 5-6. Circuit path 402 includes register 410, combinational logic path 421, register 425, combinational logic path 422, and register 430. Combinational logic paths 421 and 422 collectively represent combinational logic path 420. Register 425 represents the registers that were replaced as a result of removing the timing exception that was previously imposed on combinational logic path 420.

It is to be noted that circuit paths 401 and 402 are not limited to being single-bit-wide paths. Instead, they may be any data width that exists in the netlist. For example, they may each be 2 bit, 4 bit, 8 bit, or 16 bit wide.

Many known algorithms for retiming a digital circuit can be applied to insert registers into the combinational logic path. Below is a description of two exemplary methods for inserting registers into the combinational logic paths to account for the removal of the timing exception imposed thereon.

Figure 5:
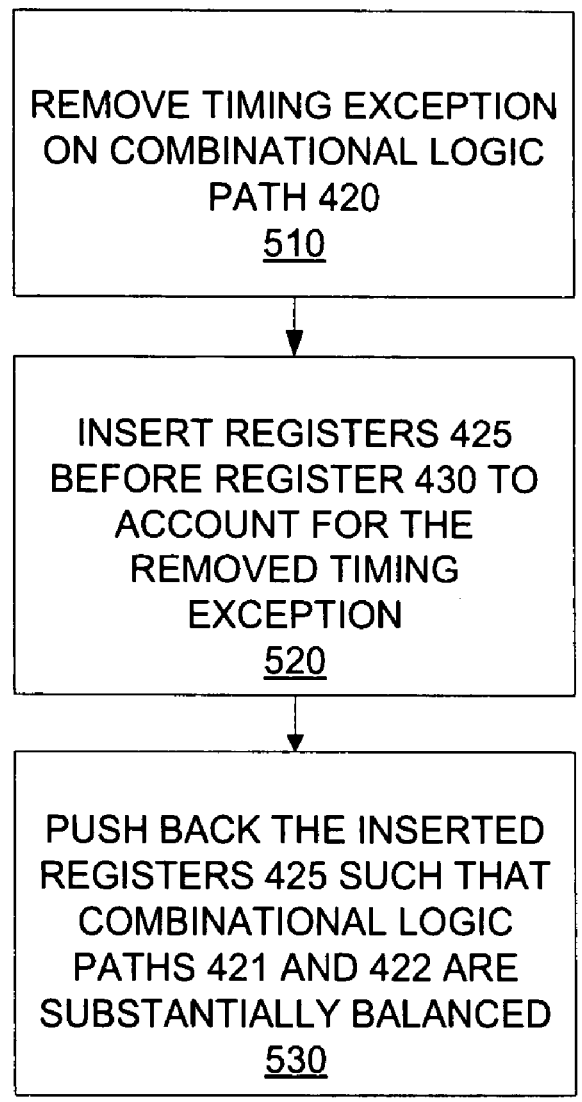
FIG. 5 is a flow chart of one embodiment of the method of inserting registers in a combinational logic path to account for the removal of a timing exception that was previously imposed on the combinational logic path.

FIG. 5 is a flow chart of one embodiment of the method of inserting registers in a combinational logic path to account for the removal of a timing exception that was previously imposed on the combinational logic path. Flow chart 500 of FIG. 5 is described in reference to the circuit paths of FIG. 4.

At 510, the timing exception on combinational logic path 420 is removed. At 520, registers 425 (only one of which is shown in FIG. 4 to avoid complicating the drawing) are inserted before register 430. At 530, the inserted registers 425 are pushed back through combinational logic path 420 to resting places such that the delays of combinational logic paths 421 and 422 are substantially balanced. In other words, the delay from register 410 to register(s) 425 is substantially equal to the delay from register(s) 425 to register 430. In one embodiment, these delays may be equal. Methods of pushing back the inserted registers to resting places that balance or substantially balance the delays of combinational logic paths 421 and 422 are known in the art. These methods are performed on the post-placement netlist. One example of a reference that discloses such a method is U.S. Pat. No. 7,120,883, which, as noted above, is entitled "Register Retiming Technique" and is incorporated herein by reference. It is to be noted that other methods for pushing back the inserted registers to resting places may also be used.

Figure 6:
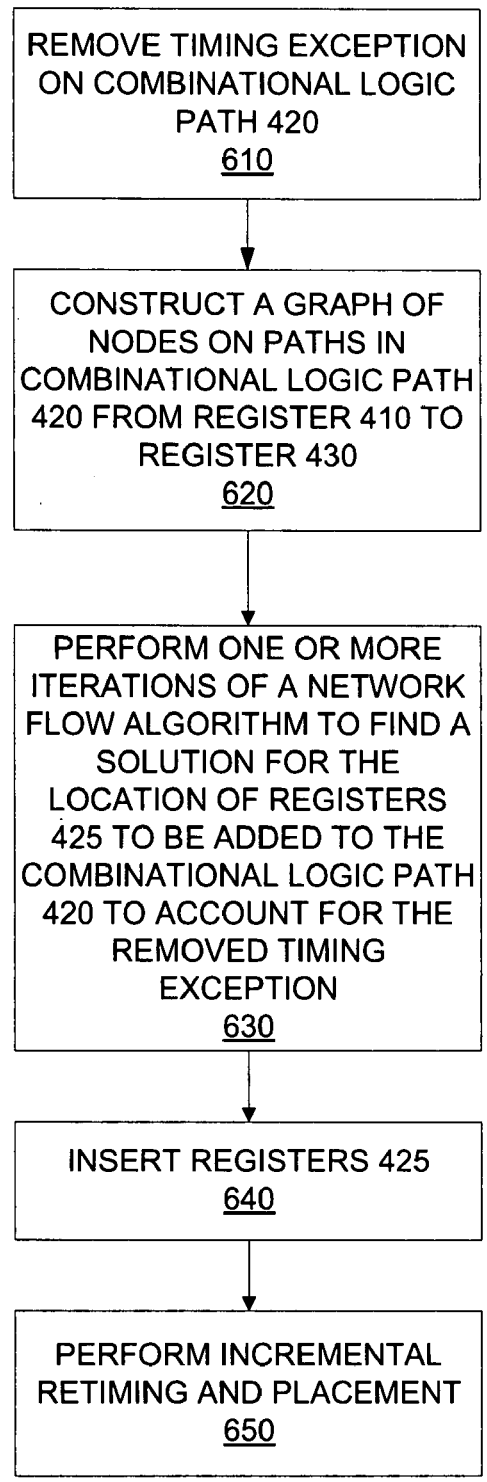
FIG. 6 is a flow chart of another embodiment of the method of inserting registers in a combinational logic path to account for the removal of a timing exception that was previously imposed on the combinational logic path.

FIG. 6 is a flow chart of another embodiment of the method of inserting registers in a combinational logic path to account for the removal of a timing exception that was previously imposed on the timing exception. Flow chart 600 of FIG. 6 is described in reference to the circuit paths of FIG. 4.

At 610, the timing exception on combinational logic path 420 is removed. At 620, a graph of nodes is constructed on the paths from register 410 to register 430, i.e., on combinational logic path 420. At 630, one or more iterations of a network flow algorithm are performed to find a solution for the location of registers 425 that need to be added to combinational logic path 420 to account for the removed timing exception. It is to be noted that the location of registers 425 is not a single location, but multiple locations, one for each register in registers 425. In one embodiment, registers 425 include a number of registers equal to the number of registers that were removed when the timing exception was imposed.

A network flow algorithm is a well-known algorithm to find a partition in a graph with a minimal set of cut-edges in the graph which separates a first register (e.g., 420) from a second register (e.g., 430). The cut-edges are where registers 425 are to be inserted. In one embodiment, the network flow algorithm is a max-flow min-cut network flow algorithm that is known in the art. Network flow algorithms, in general, and the max-flow min-cut network flow algorithms, in particular, are, for example, described in the textbook entitled "Introduction to Algorithms" by Thomas H. Cormen et al., (Second printing, 1990) (1989).

It is to be noted that 620 and 630 may be performed prior to removing the timing exception at 610. At 640, registers 425 (only one of which is shown in FIG. 4 to avoid complicating the drawing) are inserted in combinational logic path 420 as determined by the network flow algorithm determination.

In one embodiment, the network flow algorithm is used to compute the minimum depth minimum cut, which generate a set of cut-points in the above-mentioned graph of nodes. Because the minimum depth minimum cut is a full cut, it satisfies the correct latency property. However, it does not necessarily balance the delays 50-50 between (1) the source register (i.e., register 410) and the cut location and (2) the cut location and destination register (i.e., register 430). In order to balance the delays, in one embodiment, the following procedure is performed. The inserted registers (i.e., registers 425) are moved to the cut location. If the delays between registers are not balanced or approximately balanced 50-50, the network flow algorithm is used to compute a new minimum depth minimum cut, which generates a new set of cut points. Thereafter, the inserted registers are moved to the new cut locations. This process is iterated, adding the delays left on the cut registers to the removed portion of the graph at each stage. The iteration is stopped when the delays are balanced or approximately balanced 50-50.

It is to be noted that method 600 of FIG. 6 is particularly effective where the target device is an FPGA. In FPGAs, combinational logic functions use look-up-tables (LUTs) of logic cells, but not the registers. The unused registers are available to be used when inserting registers into the combinational logic path. Thus, the issue in the case of FPGAs reduces to finding a minimal subset of the combinational nodes, which are at a correct depth in the combinational section of the graph to be retimed, and replacing LUTs with the corresponding LUTs and registers of the logic cells. This does not require incremental placement, as would a traditional retiming problem. Thus, unlike standard retiming, which is a more complex algorithm meant to deal with multi-register cycles, the retiming in the above method of the present invention in the context of an FPGA is simple pipeline retiming.

At 650, incremental retiming and placement is performed on the inserted registers 425 and any combinational logic gates which needed to be added to maintain correct operation of reset and clear conditions on the registers. It is to be noted that 650 is optionally performed. It is also to be noted that incremental retiming and placement are well known in the art. For example, they are described in the article entitled "Incremental Retiming for FPGA Physical Synthesis", by Deshanand P. Singh et al., DAC 2005, Jun. 13-17, 2005, Anaheim, Calif., USA, and in U.S. patent application Ser. No. 10/876,709, which is entitled "Method and Apparatus for Performing Retiming on Field Programmable Gate Arrays." In another embodiment, the incremental retiming and placement may entail modifying the cost function of the network flow algorithm with "gadgets" such as fake edges on the graph which artificially increase the cost of the min-cut close to the source and destination registers.

Figure 7:
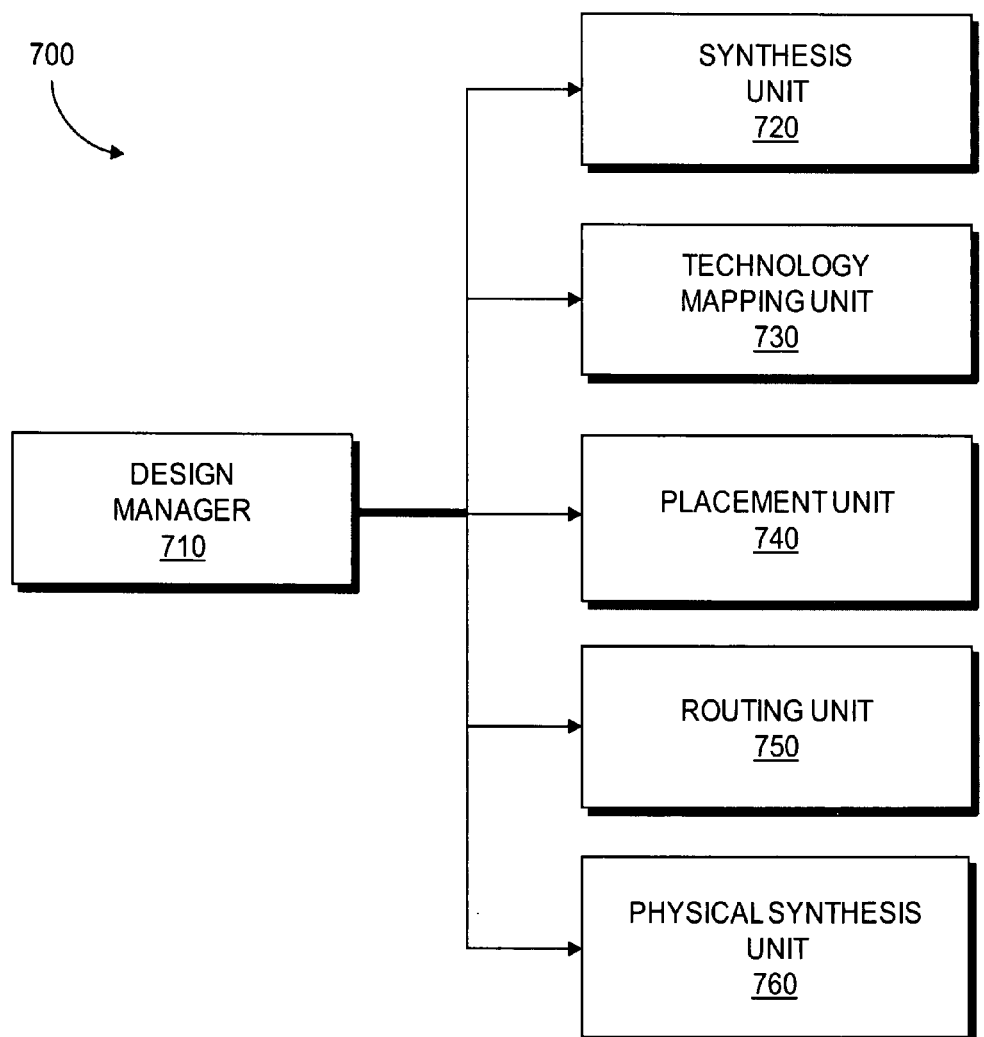
FIG. 7 illustrates a system designer according to an exemplary embodiment of the present invention.

FIG. 7 illustrates a system designer 700 according to an embodiment of the present invention. The system designer 700 may be an EDA tool for designing a system on a target device. The target device may be, for example, an ASIC, a structured ASIC, a PLD (e.g., an FPGA), or other circuitry. Furthermore the logic design may be implemented using semiconductor or nanoelectronic technology. FIG. 7 illustrates software modules implementing an embodiment of the present invention. According to one embodiment, system design may be performed by a computer system executing sequences of instructions represented by the software modules shown in FIG. 7. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 700 includes a designer manager 710. The designer manager 710 receives a design for a system. The design may be described at a gate level or in a more abstract level. The design may be described in terms of an HDL such as VHDL or Verilog. The target device may be an ASIC, a structured ASIC, a PLD (e.g., an FPGA), or other target device. The designer manager 710 is coupled to and transmits data between the components of the system designer 700.

Block 720 represents a synthesis unit that performs synthesis. The synthesis unit 720 generates a logic design of a system to be implemented in the target device. According to an embodiment of the system designer 700, the synthesis unit 720 takes a conceptual HDL design definition and generates an optimized logical representation of the system. The optimized logical representation of the system generated by the synthesis unit 720 may include a representation that has a minimized number of functional blocks and registers, such as logic gates and logic elements, required for the system. Alternatively, the optimized logical representation of the system generated by the synthesis unit 720 may include a representation that has a reduced depth of logic and that generates a lower signal propagation delay.

Block 730 represents a technology mapping unit that performs technology mapping. The technology mapping unit 730 determines how to implement the functional blocks and registers in the optimized logic representation utilizing specific resources on a target device thus creating an optimized "technology-mapped" netlist. The technology-mapped netlist illustrates how the resources (components or logic cells) on the target device are utilized to implement the system. In an embodiment where the target device is an FPGA, the components may be FPGA logic elements, memory, DSP, or other blocks. In an embodiment where the target device is an ASIC, the components could be gates or standard cells. In an embodiment where the target device is a structured ASIC, the technology-mapped netlist may contain components that can be implemented in the structured ASIC fabric, such as random access memory (RAM) blocks, multiplier blocks, and gates from a library of gates.

Block 740 represents a placement unit that performs placement. The placement unit 740 places the system on to the target device by determining which components or areas on the target device are to be used for specific functional blocks and registers. According to an embodiment of the system designer 700, the placement unit 740 first determines how to implement portions of the optimized logic design in clusters. Clusters may represent a subset of the components on the logic design. A cluster may be represented, for example, by a number of logic cells grouped together. In this embodiment, after portions of the optimized logic design are implemented in clusters, the clusters may be placed by assigning the clusters to specific positions on the target device. The placement unit 740 may utilize a cost function in order to determine a good assignment of resources on the target device.

Block 750 represents a routing unit that performs routing. The routing unit 750 determines the routing resources on the target device to use to provide interconnection between the components implementing functional blocks and registers of the logic design.

Block 760 represents a physical synthesis unit that performs physical synthesis. The physical synthesis unit 760 may perform physical synthesis immediately after design entry and prior to synthesis, immediately after technology mapping and prior to placement, immediately after placement and prior to routing, immediately after routing, and/or during other times. According to an embodiment of the present invention, physical synthesis includes a series of circuit transformations to optimize the circuit for a given goal. The circuit transformations occur outside the stage of design entry, synthesis, technology mapping, placement, and routing. Physical synthesis may be used to optimize a circuit for goals such as reducing a delay of a signal transmitted on a circuit, reduction of an area required for implementing the circuit on a target device, reducing the amount of power required for operating the circuit or the system, improving the routability of the circuit, and/or other goals as described with reference to FIG. 1.

According to an embodiment of the system designer 700, the design manager 710 performs an assembly procedure that creates a data file that includes the design of the system generated by the system designer 700. The data file may be a bit stream that may be used to program the target device. The design manager 710 may output the data file so that the data file may be stored or alternatively transmitted to a separate machine used to program the target device. It should be appreciated that the design manager 710 may also output the design of the system in other forms such as on a display device or other medium.

Figure 8:
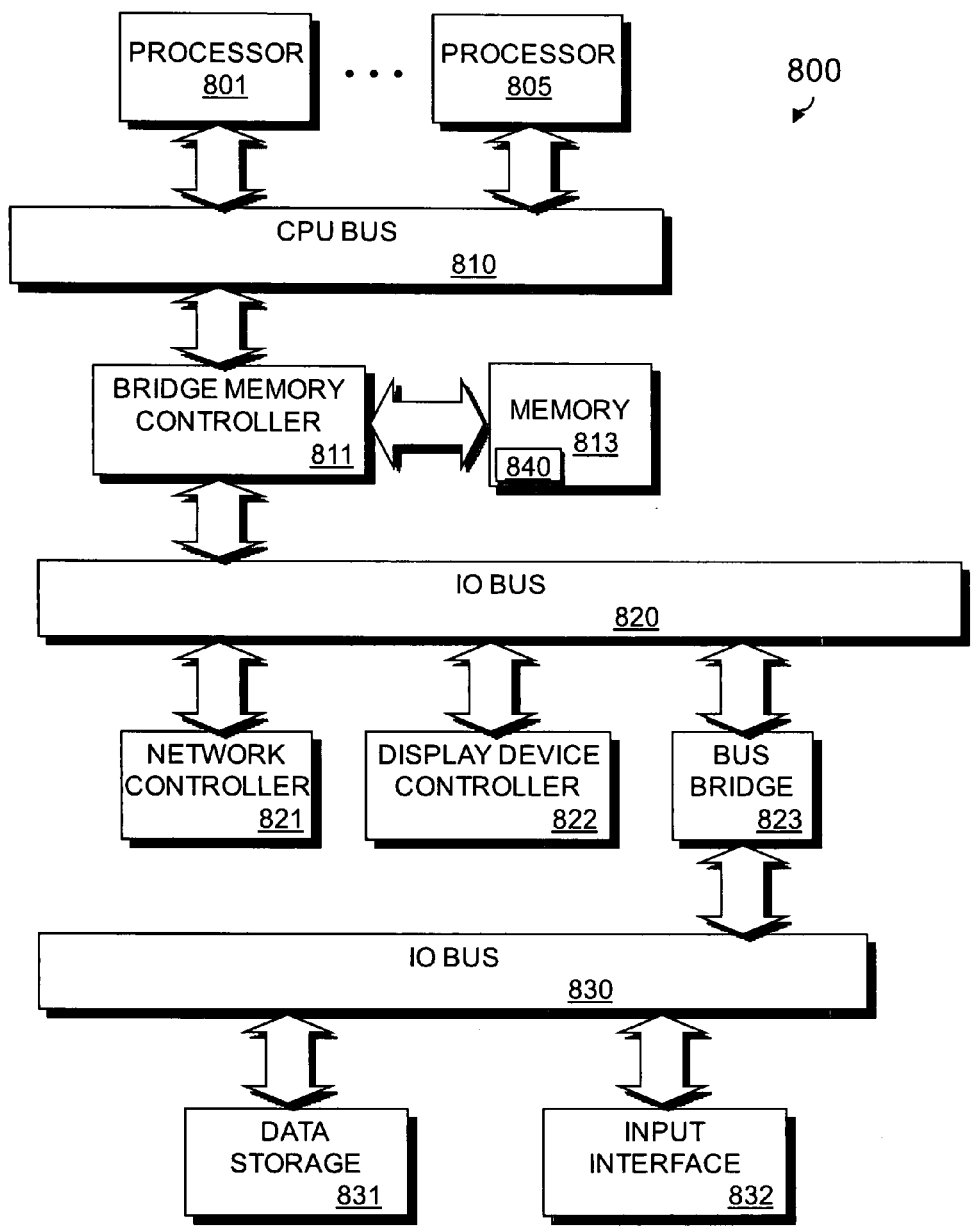
FIG. 8 illustrates a computer system according to an exemplary embodiment of the present invention.

FIG. 8 is a block diagram of an exemplary computer system 800 in which an exemplary embodiment of the present invention resides. Computer system 800 may be used to implement system designer 700 shown in FIG. 7. Computer system 800 includes one or more processors that process data signals. As shown, computer system 800 includes first processor 801 and nth processor 805, where n may be any positive integer. Processors 801 and 805 may be a complex instruction set computer microprocessor, a reduced instruction set computing microprocessor, a very long instruction word microprocessor, a processor implementing a combination of instruction sets, or other processor device. Processors 801 and 805 may be multi-core processors with multiple processor cores on each chip. Each of processors 801 and 805 and each of the processor cores may support one or more hardware threads. Processors 801 and 805 are coupled to central processing unit (CPU) bus 810 that transmits data signals between processors 801 and 805 and other components in computer system 800.

Computer system 800 includes memory 813. Memory 813 may be a dynamic random access memory (DRAM) device, a static random access memory (SRAM) device, and/or other memory device. Memory 813 may store instructions and code represented by data signals that may be executed by processor 801. A cache memory (not shown) may reside inside processor 801 that stores data signals stored in memory 813. The cache speeds access to memory by processor 801 by taking advantage of its locality of access. In an alternate embodiment of computer system 800, the cache resides external to processor 801. Bridge memory controller 811 is coupled to CPU bus 810 and memory 813. Bridge memory controller 811 directs data signals between processor 801, memory 813, and other components in computer system 800 and bridges the data signals between CPU bus 810, memory 813, and first IO bus 820.

First IO bus 820 may be a single bus or a combination of multiple buses. First IO bus 820 provides communication links between components in computer system 800. Network controller 821 is coupled to first IO bus 820. Network controller 821 may link computer system 800 to a network of computers (not shown) and supports communication among the machines. Display device controller 822 is coupled to first IO bus 820. Display device controller 822 allows coupling of a display device (not shown) to computer system 800 and acts as an interface between the display device and computer system 800.

Second IO bus 830 may be a single bus or a combination of multiple buses. Second IO bus 830 provides communication links between components in computer system 800. Data storage device 831 is coupled to second IO bus 830. Data storage device 831 may be a hard disk drive, a floppy disk drive, a CD-ROM device, a flash memory device or other mass storage device. Input interface 832 is coupled to second IO bus 830. Input interface 832 may be, for example, a keyboard and/or mouse controller or other input interface. Input interface 832 may be a dedicated device or can reside in another device such as a bus controller or other controller. Input interface 832 allows coupling of an input device to computer system 800 and transmits data signals from an input device to computer system 800. Bus bridge 823 couples first IO bus 820 to second IO bus 830. Bus bridge 823 operates to buffer and bridge data signals between first IO bus 820 and second IO bus 830. It should be appreciated that computer systems having a different architecture may also be used to implement computer system 800.

System designer 840 may reside in memory 813 and be executed by one or more of processors 801 and 805. System designer 840 may operate to synthesize a system, place the system on a target device, route the system, and perform physical synthesis for the system.

Embodiments of the present invention may be provided as a computer program product or software. In one embodiment, embodiments of the present invention may be provided as a machine-accessible or machine-readable medium (e.g., an electronically machine-accessible or machine-readable medium) having instructions. In one embodiment, embodiments of the present invention may be provided as an article of manufacture that includes a machine-accessible or machine-readable medium having instructions. The instructions on the machine-accessible or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine-accessible medium" or "machine-readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method for designing a system on a target device, the method comprising:
    replacing a plurality of registers with at least one register and a timing exception, wherein the replacing is computer implemented;
    identifying a first plurality of registers that are in series or substantially in series, wherein the first plurality of registers includes the plurality of registers;
    traversing backward from the first plurality of registers through a first combinational logic path to a first register;
    performing a timing analysis on the first combinational logic path;
    traversing forward from the first plurality of registers through a second combinational logic path to a second register;
    performing a timing analysis on the second combinational logic path; and
    if the first combinational logic path is longer than the second combinational logic path, then the timing exception is imposed on the first combinational logic path;
    if the second combinational logic path is longer than the first combinational logic path, then the timing exception is imposed on the second combinational logic path.

2. The method of claim 1, wherein the plurality of registers are in series or substantially in series.

3. The method of claim 1, wherein the timing exception is a multicycle-k timing exception, wherein k represents number of removed registers.

4. The method of claim 1 further comprising:
    removing the timing exception; and
    adding a second plurality of registers to account for the removing of the timing exception.

5. The method of claim 4, wherein the second plurality of registers includes one register less than the plurality of registers.

6. The method of claim 4, wherein the adding the second plurality of registers comprises:
    inserting the second plurality of registers in a combinational logic path before the at least one register; and
    pushing back the second plurality of registers such that a third combinational logic path from a third register to the second plurality of registers is substantially balanced with a fourth combinational logic path from the second plurality of registers to the at least one register.

7. The method of claim 4, wherein the removing the timing exception and the adding the second plurality of registers comprise:
    constructing a graph of nodes on paths in a combinational logic path from a third register to the at least one register;
    performing one or more iterations of a network flow algorithm to find a solution for a location for the second plurality of registers that need to be added to the combinational logic path to account for the removing of the timing exception; and
    inserting the second plurality of registers in the combinational logic path as determined by the network flow algorithm.

8. The method of claim 1, wherein the replacing the plurality of registers comprises replacing the plurality of registers with a single register and the timing exception.

9. A method for designing a system on a target device, the method comprising:
    identifying a first plurality of registers that are in series or substantially in series;
    traversing backward from the first plurality of registers through a first combinational logic path to a first register;
    performing a timing analysis on the first combinational logic path;
    traversing forward from the first plurality of registers through a second combinational logic path to a second register;
    performing a timing analysis on the second combinational logic path;
    replacing the first plurality of registers with at least one register, wherein the replacing is computer implemented;
    if the first combinational logic path is longer than the second combinational logic path, then a multicycle timing exception is imposed on the first combinational logic path;
    if the second combinational logic path is longer than the first combinational logic path, then the multicycle timing exception is imposed on the second combinational logic path;
    removing the multicycle timing exception; and
    adding a second plurality of registers to a combinational logic path to account for the removing of the multicycle timing exception.

10. The method of claim 9, wherein the adding the second plurality of registers comprises:
    inserting the second plurality of registers in the combinational logic path before the at least one register; and
    pushing back the second plurality of registers such that a third combinational logic path from a third register to the second plurality of registers is substantially balanced with a fourth combinational logic path from the second plurality of registers to the at least one register.

11. The method of claim 9, wherein the removing the multicycle timing exception and the adding the second plurality of registers comprises:
- constructing a graph of nodes on paths in the combinational logic path from a third register to the at least one register;
- performing one or more iterations of a network flow algorithm to find a solution for a location for the second plurality of registers that need to be added to the combinational logic path to account for the removing of the multicycle timing exception; and
- inserting the second plurality of registers in the combinational logic path as determined by the network flow algorithm.

12. The method of claim 9, wherein the replacing the first plurality of registers comprises replacing the first plurality of registers with a single register.

13. A non-transitory machine-readable medium including sequences of instructions, the sequences of instructions including instructions which when executed by a machine cause the machine to perform:
- replacing a plurality of registers in series with at least one register and a timing exception;
- identifying a first plurality of registers that are in series or substantially in series, wherein the first plurality of registers includes the plurality of registers;
- traversing backward from the first plurality of registers through a first combinational logic path to a first register;
- performing a timing analysis on the first combinational logic path;
- traversing forward from the first plurality of registers through a second combinational logic path to a second register;
- performing a timing analysis on the second combinational logic path; and
- if the first combinational logic path is longer than the second combinational logic path, then the timing exception is imposed on the first combinational logic path;
- if the second combinational logic path is longer than the first combinational logic path, then the timing exception is imposed on the second combinational logic path.

14. The non-transitory machine-readable medium of claim 13, wherein the timing exception is a multicycle-k timing exception, wherein k represents number of removed registers.

15. The non-transitory machine-readable medium of claim 13 further comprising instructions to perform:
- removing the timing exception; and
- adding a second plurality of registers to account for the removing of the timing exception.

16. The non-transitory machine-readable medium of claim 15, wherein the adding the second plurality of registers comprises:
- inserting the second plurality of registers in a combinational logic path before the at least one register; and
- pushing back the second plurality of registers such that a third combinational logic path from a third register to the second plurality of registers is substantially balanced with a fourth combinational logic path from the second plurality of registers to the at least one register.

17. The non-transitory machine-readable medium of claim 15, wherein the removing the timing exception and the adding the second plurality of registers comprise:
- constructing a graph of nodes on paths in the combinational logic path from a third register to the at least one register;
- performing one or more iterations of a network flow algorithm to find a solution for a location for the second plurality of registers that need to be added to the combinational logic path to account for the removing of the timing exception; and
- inserting the second plurality of registers in the combinational logic path as determined by the network flow algorithm.

18. The non-transitory machine-readable medium of claim 13, wherein the non-transitory machine-readable medium is an electronically machine-readable medium.

19. An article of manufacture including the non-transitory machine-readable medium of claim 13.

* * * * *